Feb. 27, 1940.  W. R. SMITH  2,191,632
HINGE
Filed Dec. 3, 1936
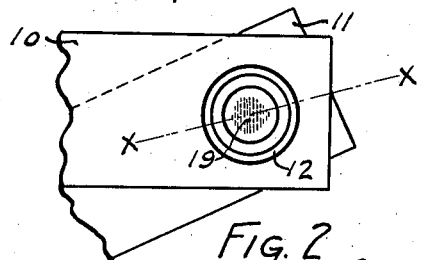
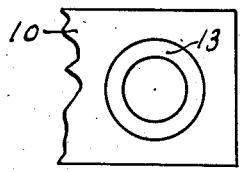
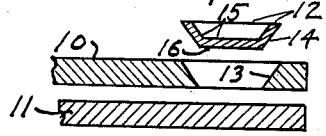
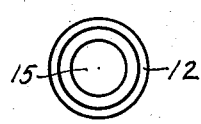
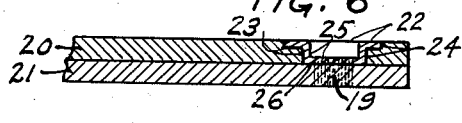
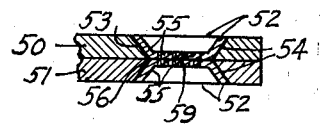
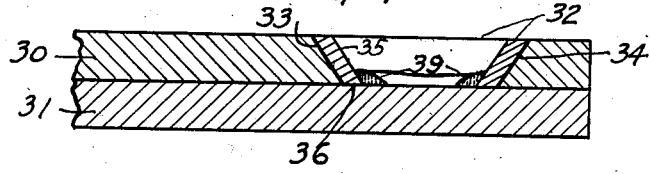
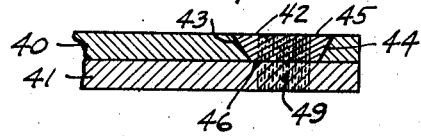
INVENTOR.
WELDEN R. SMITH
BY Clinton R. Sipe
ATTORNEY.

Patented Feb. 27, 1940

2,191,632

UNITED STATES PATENT OFFICE 2,191,632

HINGE

Welden R. Smith, Chicago, Ill.

Application December 3, 1936, Serial No. 113,950

1 Claim. (Cl. 287—101)

This invention relates in general to pivoted joints and more particularly to hinges and the method of making the same.

The object of the invention is to provide a new and improved pivoted joint or hinge which is of simple and reliable construction and which may be easily and cheaply manufactured.

A feature of the invention relates to the construction of the pivoted joint or hinge and in the manner in which the separable members are pivotally secured.

The invention is illustrated in the accompanying drawing in which Fig. 1 shows a plan view of the preferred pivoted joint or hinge, Fig. 2 shows a cross section taken on the line X—X of Fig. 1, Fig. 3 shows an exploded view, Fig. 4 shows the cup-shaped bearing member and Fig. 5 shows a bearing hole cut in one of the separable members.

Figs. 6, 7, 8 and 9 show cross-sections of different modifications of the invention.

Referring now to the preferred arrangement shown in Figs. 1 to 5, inclusive, the hinge comprises three members: the separable pivoted members 10 and 11 and the bearing member 15. The pivoted member 10 may be of any desired shape and may consist of metal or any suitable rigid material.

The other pivotal member 11 may also be of any desired shape but must consist of some kind of fusible metal, preferably ferrous metal. The cup-shaped bearing member 15 should consist, preferably, of the same fusible metal as member 11.

A hole 13 is counter-sunk in member 10 as shown in Figs. 3 and 5. The cup-shaped bearing member 15, shown in Figs. 3 and 4 has a bearing surface 14 extending around its periphery, an upper surface or edge 12, and a lower surface or bottom 16. This cup-shaped bearing member is preferably made from a flat sheet of metal and is punch-pressed in the form shown by a suitable die in a punch-press. The cup-shaped bearing member 15 has an overall depth equal to the thickness of the member 10 and is inserted in the hole 13 so that the bearing surface 14 engages the beveled edge of hole 13. When the bearing member 15 is inserted in hole 13, the upper edge 12 is flush with the upper face of member 10 and the lower surface or bottom 16 of the bearing member is flush with the lower face of member 10. The member 11 is now placed in desired position with its upper face adjacent the lower face of member 10 in which position the lower surface 16 of the bearing member 15 is resting against the upper face of member 11. After this assembly the bottom or surface 16 of the bearing member is spot welded to member 11 as indicated at 19 thereby rigidly securing bearing member 15 to member 11. The hole 13 and the bearing surface 14 of the bearing member are of substantially the same diameter to enable the two members 10 and 11 to easily pivot. Due to the slanting or beveled edges of hole 13 and bearing member 15, which is now rigidly secured to member 11 by spot welding 19, the two members 10 and 11 are pivotally secured to each other. Since the edge 12 of bearing member 15 is flush with the face of member 10, there are no objectionable projections which extend therefrom to interfere with any movement of the pivoted joint in case the joint as a whole is to be moved an appreciable distance.

The modification shown in Fig. 6 comprises two blades or arms 20 and 21, similar to members 10 and 11 of Figs. 1 and 3, and a cup-shaped flanged bearing member 25, somewhat similar to member 15. In this modification the member 20 is counter-bored as shown at 23 to provide the bearing surfaces for the flanged periphery of the cup-shaped bearing member 25. The members 20, 21 and 25 are assembled and the bearing member 25 is welded to member 21 in the same manner as previously described.

The modification shown in Fig. 7 is a pivoted joint or hinge of a much larger type than those previously described. This hinge comprises two plates or blades 30 and 31, somewhat similar but larger than blades 10 and 11, and a bearing member 35 in the form of a race or collar-shaped ring having slanting edges of which the outer edge 34 acts as the bearing surface. The bearing member 35 is inserted in the beveled hole 33 with the edges 34 and 36 flush with the two surfaces of plate 30 and then welded, as shown at 39, to the plate 31 to pivotally secure member 30 to member 31.

The modification shown in Fig. 8 is similar to Figs. 1 to 5 inclusive except that the bearing member 45 is a solid or coined bearing member which is welded to member 41 as shown at 49 to pivotally secure member 40 to member 41.

A further modification shown in Fig. 9 comprises two pivoted members 50 and 51 each having a countersunk hole 53 and two cup-shaped bearing members 55 with their smaller surfaces or bottoms 56 welded together at 59. The two members 50 and 51 are rotatable on the periphery bearing surfaces 54 of their associated bearing members 55. Due to the slanting edges 54 of the welded bearing members 55 and the beveled edges 53 of the holes, the members 50 and 51 are pivotally secured together. In this modification only the two cup-shaped bearing members 55 need be of fusible metal while the pivoted members 50 and 51 may be any suitable rigid material such as fibre or any metal.

A hinge of the type disclosed besides being easily manufactured has a decided advantage over hinges of the rivet type in that there is no tendency to bind at the joint such as occurs in case the rivet member is too tightly riveted. There is also no tendency to a sloppy or loose joint when the bearing hole and bearing member are made to the proper dimensions. In addition the extending projections or the enlarged portion at the joint itself has been done away with to enable the joint as a whole to be moved. Therefore, projections adjacent the path of travel of the joint do not interfere with the movement of the joint.

Having described the invention, what is considered new and is desired to have protected by Letters Patent will be set forth in the following claim.

What is claimed is:

A hinged joint for connecting the ends of two flat strip like members having adjacent faces, one of said members having an aperture extending therethrough, the diameter of said aperture being greater on the outer face of said one member than on the opposite adjacent face of said one member, a hollow plug member conforming in shape to the shape of said aperture and disposed in said aperture with its inner end surface in abutting relation with the adjacent face of the other of said two members, and a fused metal connection rigidly securing the abutting surfaces of said plug member and said other member together.

WELDEN R. SMITH.